(12) United States Patent
Cho et al.

(10) Patent No.: US 11,229,263 B2
(45) Date of Patent: Jan. 25, 2022

(54) HOOK DEVICE

(71) Applicant: PIOLAX, INC., Kanagawa (JP)

(72) Inventors: Jung Hyung Cho, Incheon (KR); Hyun Kook Park, Incheon (KR); Ki Seob Nam, Incheon (KR)

(73) Assignee: PIOLAX, INC., Kanagawa (JP)

( * ) Notice: Subject to any disclaimer, the term of this patent is extended or adjusted under 35 U.S.C. 154(b) by 0 days.

(21) Appl. No.: 17/048,001

(22) PCT Filed: Apr. 12, 2019

(86) PCT No.: PCT/JP2019/015924
§ 371 (c)(1),
(2) Date: Oct. 15, 2020

(87) PCT Pub. No.: WO2019/203144
PCT Pub. Date: Oct. 24, 2019

(65) Prior Publication Data
US 2021/0161256 A1 Jun. 3, 2021

(30) Foreign Application Priority Data
Apr. 19, 2018 (JP) .............................. JP2018-080598

(51) Int. Cl.
*A44B 13/00* (2006.01)
(52) U.S. Cl.
CPC ................. *A44B 13/0029* (2013.01)
(58) Field of Classification Search
CPC ......... A44B 13/0029; B60R 5/04; B60R 7/02; B60R 7/04; B60R 7/08; F16B 5/10; F16B 45/00; B60N 3/00; B60P 7/0807
See application file for complete search history.

(56) References Cited

U.S. PATENT DOCUMENTS

| 6,665,911 B1* | 12/2003 | Huang | B60P 7/0807 24/163 K |
| 6,783,313 B1* | 8/2004 | Huang | B60P 7/0807 410/102 |

(Continued)

FOREIGN PATENT DOCUMENTS

| JP | 2002-331865 A | 11/2002 |
| JP | 2006-007983 A | 1/2006 |

(Continued)

OTHER PUBLICATIONS

International Search Report issued in PCT/JP2019/015924 dated May 14, 2019 with English Translation (6 pages).

*Primary Examiner* — Robert Sandy
*Assistant Examiner* — Rowland Do
(74) *Attorney, Agent, or Firm* — Nakanishi IP Associates, LLC

(57) ABSTRACT

A hook device makes it easy to return a hook from a raised state to a stored state. This hook device has a holding member and a hook member, the holding member has an integrally formed elastic piece, the hook member has a rotating shaft and a hanger, the outer periphery of the rotating shaft is provided with an arcuately formed rotating surface and a holding surface formed so as to be close to the rotating shaft center, and the elastic piece abuts against the rotating surface of the rotating shaft in a flexural state when the hook member is raised, and abuts against the holding surface of the rotating shaft when the hook member is stored.

10 Claims, 14 Drawing Sheets

(56) References Cited

U.S. PATENT DOCUMENTS

| | | | |
|---|---|---|---|
| 10,899,265 B2* | 1/2021 | McKimson | B60P 7/0807 |
| 11,015,639 B1* | 5/2021 | Huang | B60P 7/0807 |
| 2008/0295288 A1 | 12/2008 | Hung | |
| 2016/0123529 A1* | 5/2016 | Ogawa | F16M 13/022 |
| | | | 248/222.52 |
| 2017/0001571 A1* | 1/2017 | Cho | B60R 5/00 |
| 2018/0339661 A1* | 11/2018 | Sotome | F16B 45/00 |

FOREIGN PATENT DOCUMENTS

| | | |
|---|---|---|
| JP | 3144440 U | 8/2008 |
| JP | 2013-011303 A | 1/2013 |
| JP | 2013-064500 A | 4/2013 |

\* cited by examiner

HOOK DEVICE

TECHNICAL FIELD

The present invention relates to a hook device to be attached to a luggage room of an automobile or the like.

BACKGROUND ART

For example, a floor surface (luggage floor), a side wall, or the like of a luggage room of an automobile is provided with a hook device that hangs a hook for stretching a belt, a rope, a net, or the like in order to fix luggage so as not to shake when the automobile is traveling.

As a conventional hook device of this type, Patent Literature 1 describes a latch including a fastener in a substantially U-shape including a pair of legs and a hinge portion coupling them, the fastener for fixing a case body to an attachment panel, a hook having a shaft part that is turnably supported by the fastener, and a lever turnably supported by the shaft part.

Furthermore, the case body has a rectangular bathtub shape with an opening at the upper part, and engagement claws are respectively projected on the inner peripheral upper edge parts of a pair of side walls along the longitudinal direction, and these engagement claws are respectively locked with a pair of coupling sides of the hook stored in the case body to temporarily hold the hook. Then, the hook can be used by raising the hook stored in the case body and releasing the locking state between the engagement claw of the case body and the coupling side of the hook. It is to be noted that in this state, the pair of legs of the U-shaped fastener holds the shaft part of the hook to apply a predetermined frictional force, thereby maintaining the hook at a predetermined angle.

CITATION LIST

Patent Literature

Patent Literature 1: JP-A-2013-11303

SUMMARY OF INVENTION

Problems to be Solved by Invention

In the latch of Patent Literature 1 described above, when it is desired to store the hook into the case body from the use state, the hook is rotated toward the bottom surface side of the case body. At this time, since frictional force is applied to the shaft part of the hook by the pair of legs of the fastener, it is necessary to push the hook to a position close to the bottom surface of the case body, and it has been difficult to return the hook to the stored state.

Therefore, an object of the present invention is to provide a hook device that makes it easy to return a hook from a raised state to a stored state.

Solution to Problems

In order to achieve the above object, the present invention is a hook device having a holding member to be attached to an attached member, and a hook member to be rotatably held by the holding member, wherein the holding member has an elastic piece integrally formed with the holding member, the hook member has a rotating shaft rotatably supported by the holding member and a hanger connected consecutively to the rotating shaft, and the hook member is brought into a stored state where the hook member is close to the attached member and a raised state where the hook member erects from the attached member, an outer periphery of the rotating shaft is provided with a rotating surface formed in an arc shape and a holding surface formed so as to approach a shaft center of the rotating shaft, and the elastic piece is configured so as to abut against the rotating surface of the rotating shaft in a flexural state in the raised state of the hook member, and abut against the holding surface of the rotating shaft in the stored state of the hook member.

Effects of Invention

According to the present invention, when the hook member is brought into a raised state from a stored state, the elastic piece of the holding member abuts against the rotating surface of the rotating shaft of the hook member in a flexural state, thereby allowing the hook member to be easily maintained into a raised state with less backlash, and when the elastic piece exceeds a boundary between the rotating surface and the holding surface by rotating the hook member in a direction close to the attached member from the raised state of this hook member, frictional force between the elastic piece and the rotating surface decreases, while the hook member can be rotated in a direction close to the attached member by the pressure force by the elastic piece applied to the holding surface and the rotating torque by the dead weight of the hook member, and hence the hook member can be easily returned to the stored state.

DESCRIPTION OF EMBODIMENTS

An embodiment of a hook device according to the present invention will be described below with reference to FIGS. 1 to 8.

Figure 1:
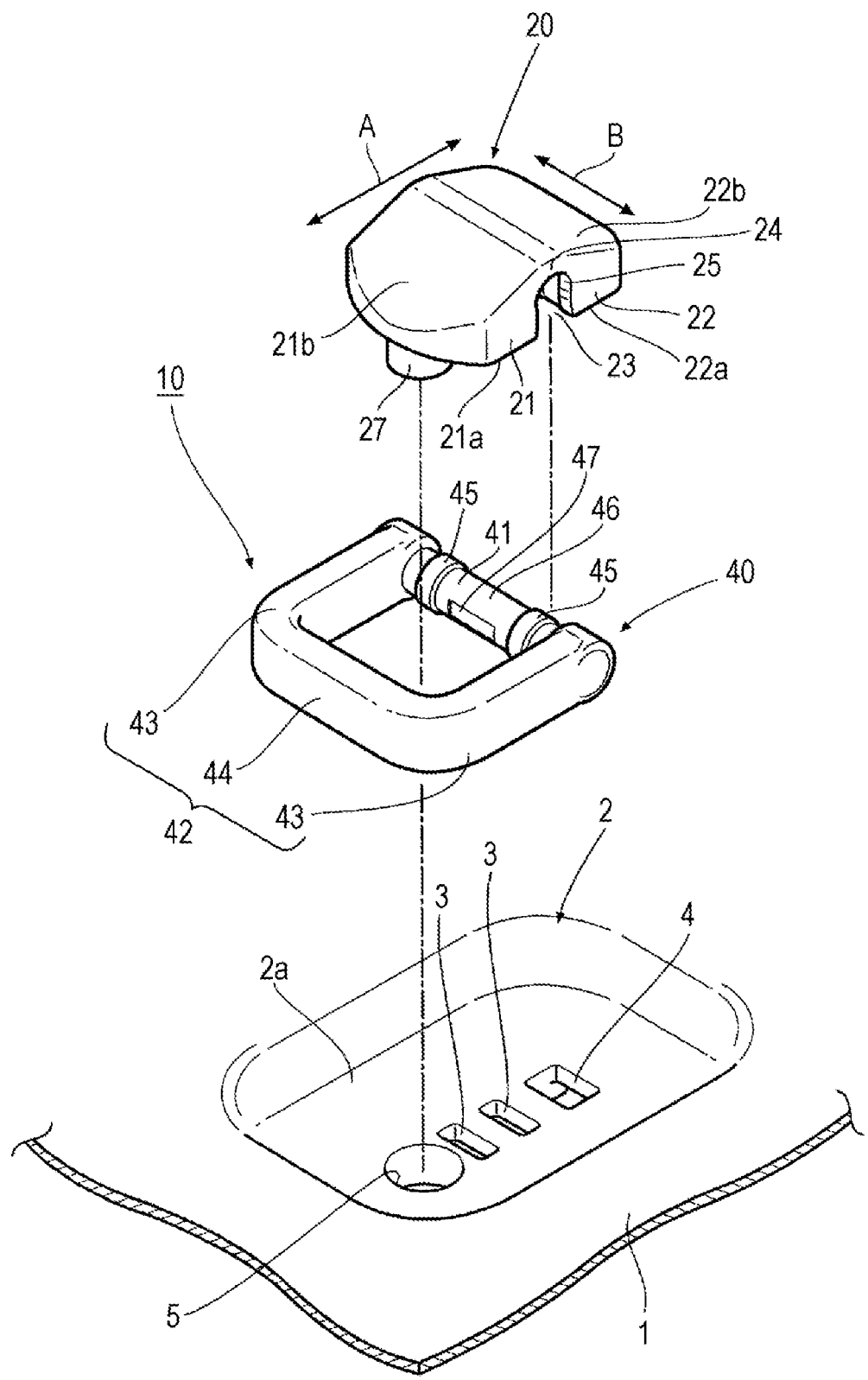
FIG. 1 is an exploded perspective view illustrating one embodiment of a hook device according to the present invention.

As illustrated in FIG. 1, a hook device 10 in this embodiment has a holding member 20 attached to an attached member 1, and a hook member 40 rotatably held by the holding member 20. It is to be noted that the attached member 1 can include a floor surface side panel, a side panel, and a trim board of a luggage room, as well as interior members such as a dashboard and a seat of an automobile such as a wagon type or an RV type, for example, but it is not particularly limited.

The attached member 1 is formed with a substantially rectangular recess 2 at a predetermined depth. A pair of elongated holes 3 and 3 is provided at predetermined positions on a bottom surface 2a of the recess 2 in a penetrating manner at predetermined intervals. It is to be noted that the holes 3 are arranged in an orientation where the length direction thereof is orthogonal to a longitudinal direction of the recess 2.

Figure 5:
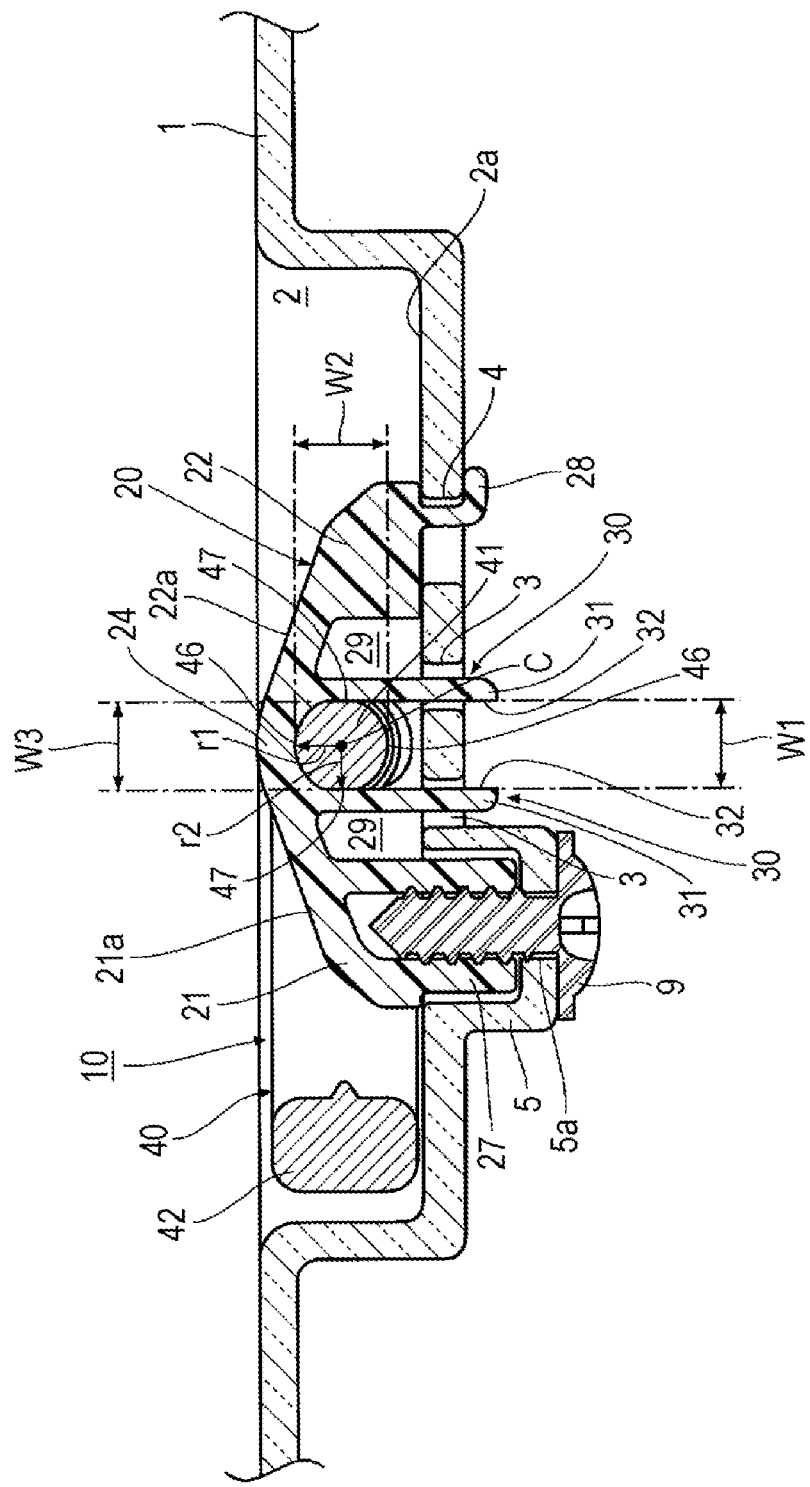
FIG. 5 is a cross-sectional explanatory view of the hook device in a state where the hook member is stored.
Figure 6:
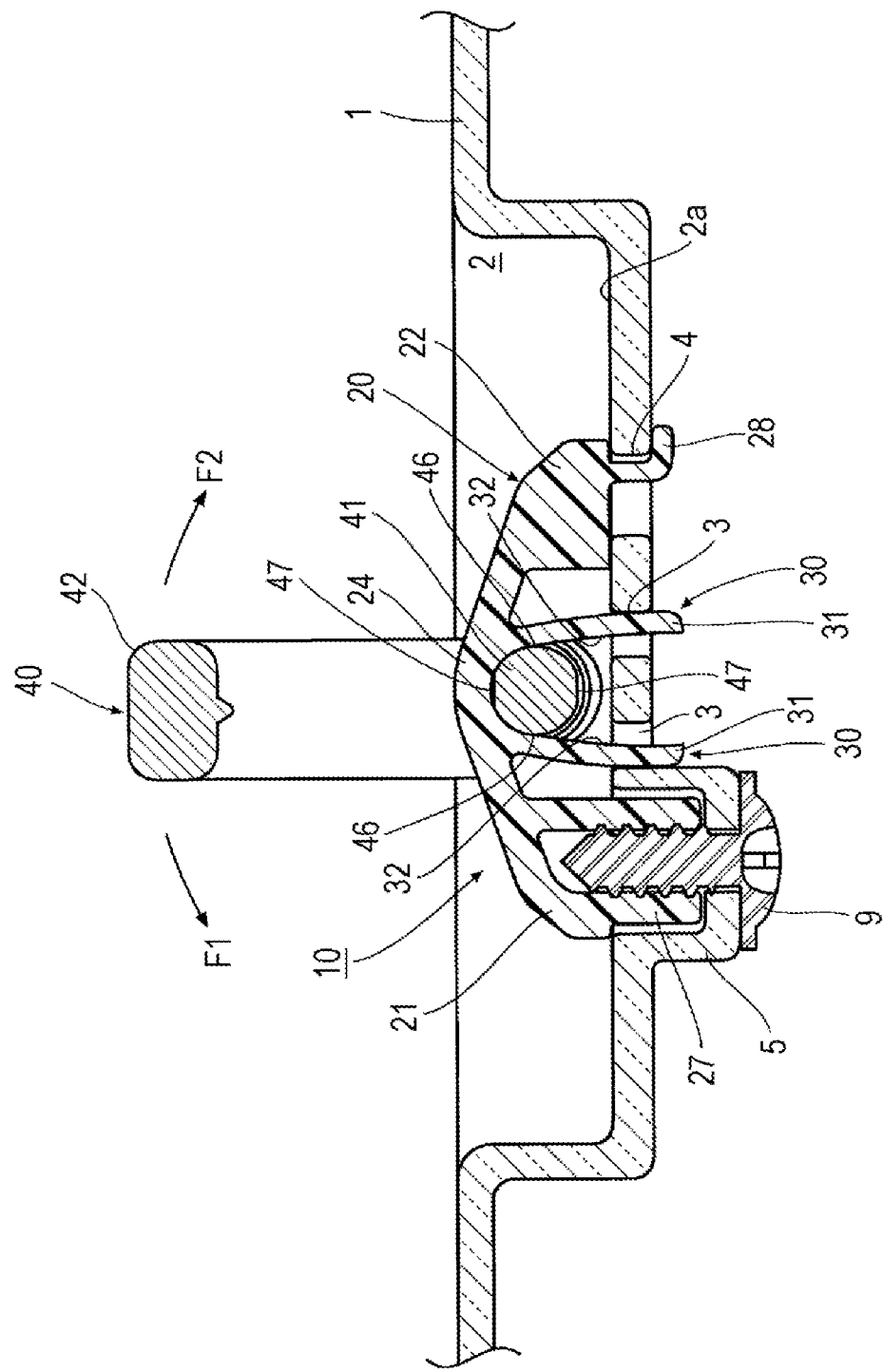
FIG. 6 is a cross-sectional explanatory view of the hook device in a state where the hook member is raised.

As illustrated in FIGS. 5 to 8, elastic pieces 30 and 30 provided on the holding member 20 are inserted into the pair of holes 3 and 3. Furthermore, as illustrated in FIG. 6, in a state where the hook member 40 is raised at a maximum rotation angle, i.e., here, a state where the hook member 40 is raised at an angle orthogonal to the bottom surface 2a of the recess 2, a tip end 31 of the elastic piece 30 having flexural deformation abuts against an inner periphery of the hole 3, and hence the expansion is restricted to restrict excessive flexure of the elastic piece 30. That is, the hole 3 forms a "restrictor" for restricting excessive flexure of the elastic piece 30 in a raised state of the hook member 40 in the present invention. It is to be noted that the restrictor in the present invention may be provided not on the attached member 1 side but on the holding member side, or may not be a hole.

As illustrated in FIG. 1, on the bottom surface 2a of the recess 2, a substantially quadrangular locking hole 4 is formed at a position adjacent to one hole 3, and a downwardly cylindrical receiver 5 is projected at a position adjacent to the other hole 3. It is to be noted that as illustrated in FIG. 5, a screw insertion hole 5a is formed at a bottom of the receiver 5.

Figure 2:
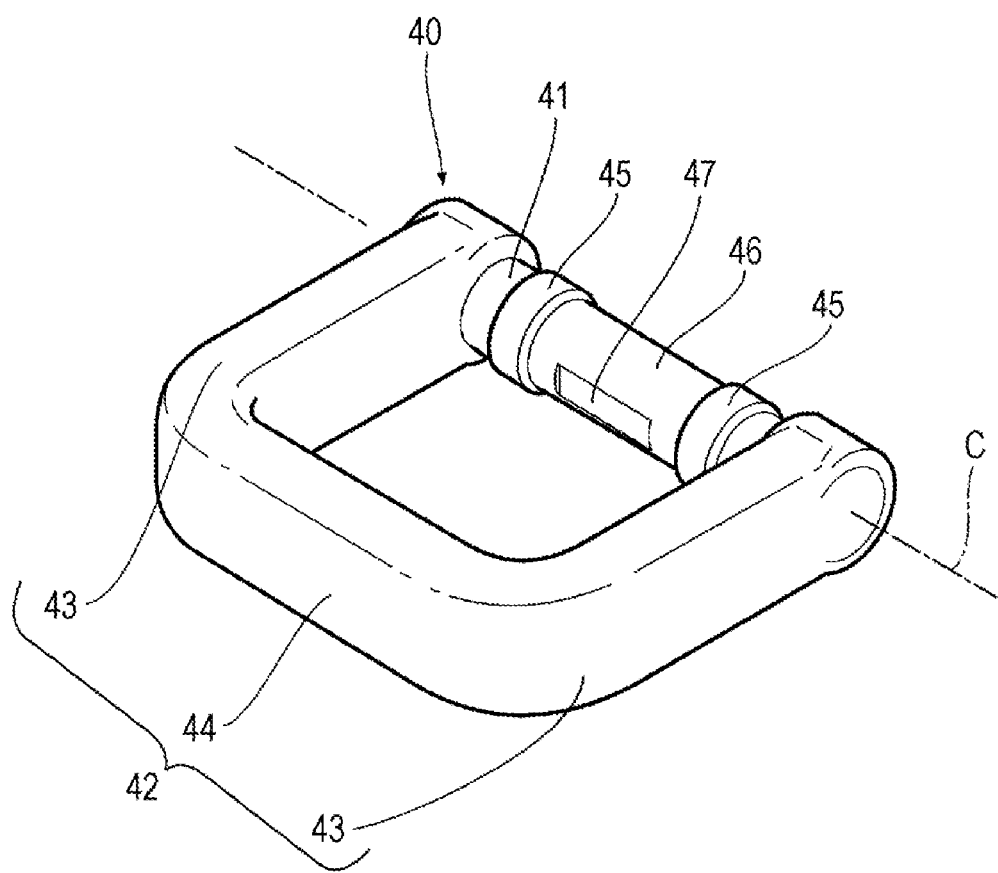
FIG. 2 is a perspective view of a hook member constituting the hook device.
Figure 7:
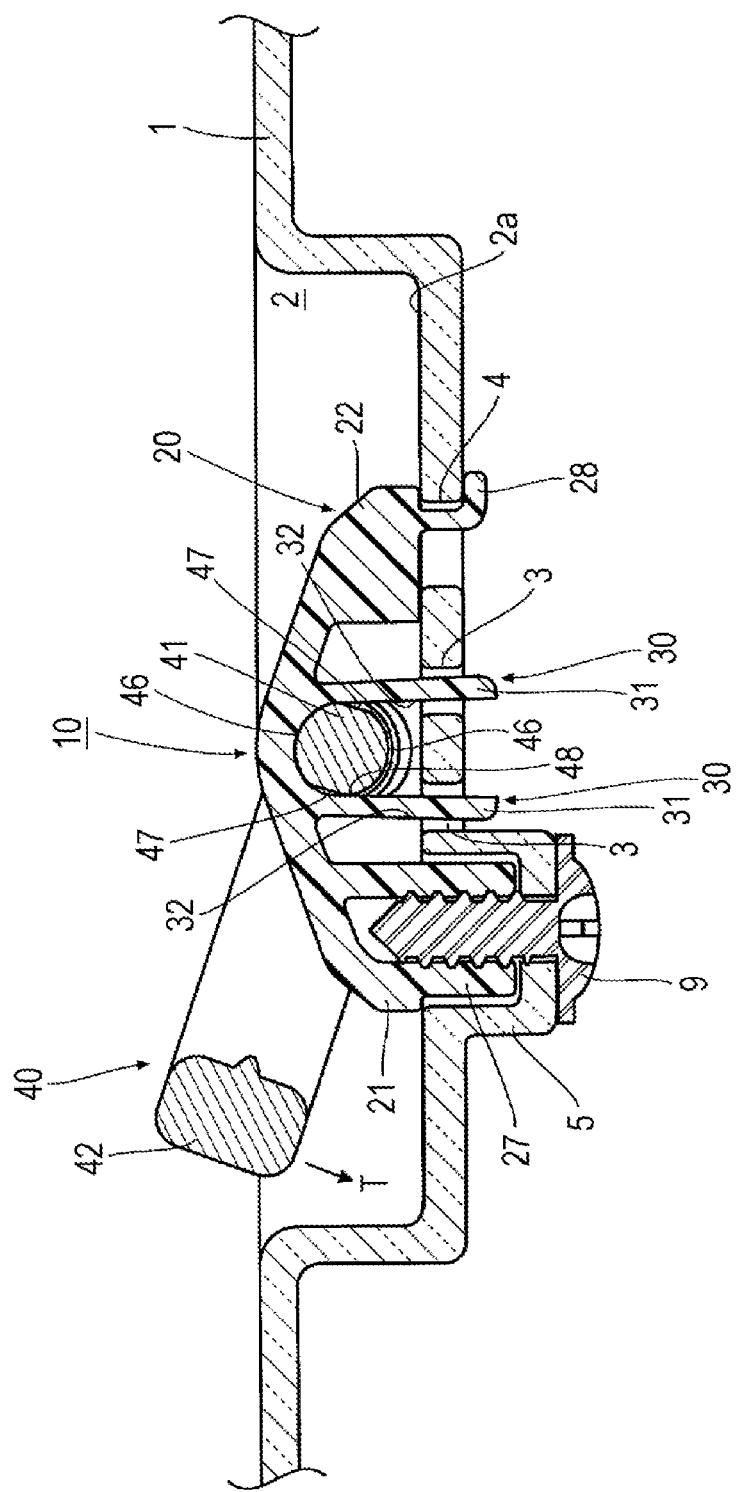
FIG. 7 is a cross-sectional explanatory view of the hook device when the hook member is rotated in a direction close to an attached member from the state illustrated in FIG. 6.
Figure 8:
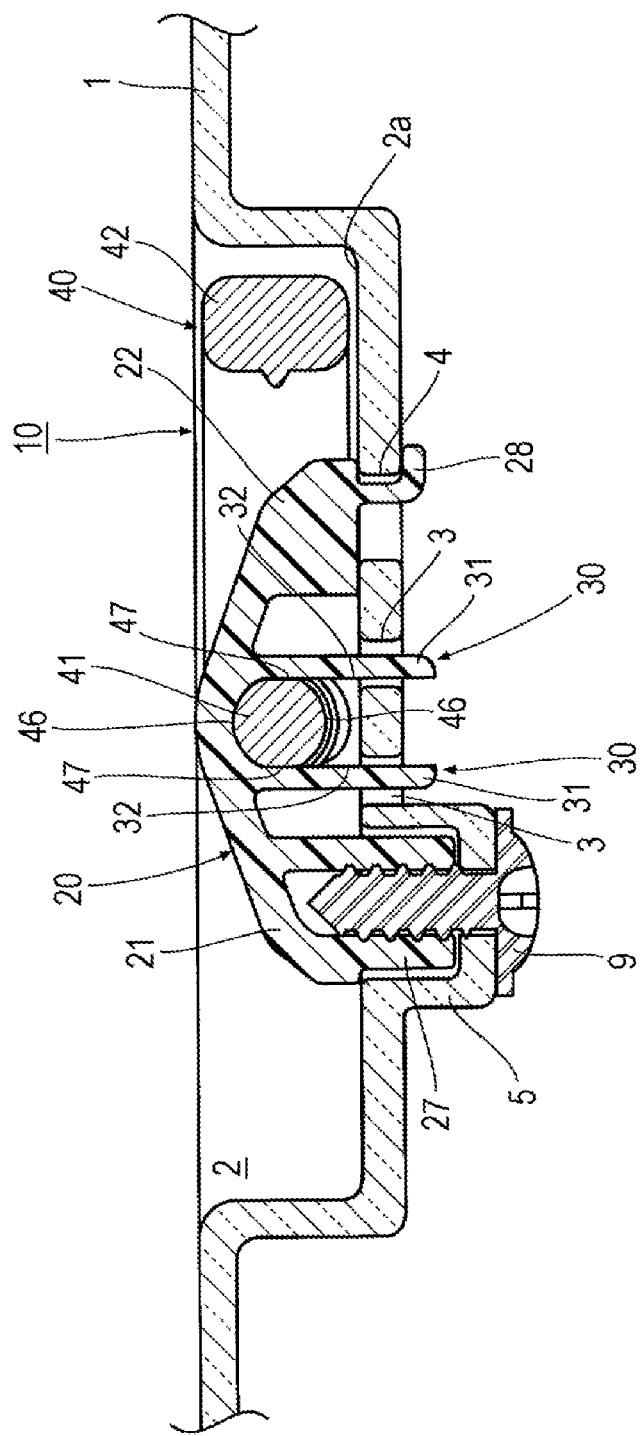
FIG. 8 is a cross-sectional explanatory view of the hook device in a state where the hook member is rotated by 180° with respect to the situation illustrated in FIG. 5 and stored.

Next, the hook member 40 will be described in detail. As illustrated in FIG. 2, the hook member 40 has a rotating shaft 41 extending at a predetermined length and a hanger 42 connected consecutively to the rotating shaft 41. The hook member 40 is to be rotatably held by the holding member 20 so as to be brought into a stored state close to the attached member 1 as illustrated in FIGS. 5 and 8 and into a raised state erecting from the attached member 1 as illustrated in FIGS. 6 and 7.

The hanger 42 in this embodiment includes a pair of arms 43 and 43 extending from both axial ends of the rotating shaft 41 in a direction orthogonal to a shaft center C of the rotating shaft 41, the arms 43 and 43 arranged in parallel to each other, and a coupler 44 coupling tip ends in the extending direction of the pair of arms 43 and 43 together and arranged along the shaft center C (see FIG. 2) of the rotating shaft 41. As a result, the hook member 40 in this embodiment has a substantially D-shaped annular shape as a whole.

Furthermore, the rotating shaft 41 has a cylindrical shape having a circular cross section basically, and annular portions 45 and 45 forming an annular projection shape are provided from an outer periphery near both axial ends thereof. Furthermore, the outer periphery of a predetermined portion between the pair of annular portions 45 and 45 of the rotating shaft 41 is provided with a rotating surface 46 formed in an arc shape and a holding surface 47 formed so as to be close to the shaft center C of the rotating shaft 41.

Referring also to FIG. 5, in this embodiment, a pair of arcuate rotating surfaces 46 and 46 is formed at two positions facing the circumferential direction of the outer periphery of the rotating shaft 41, and a pair of flat planar holding surfaces 47 and 47 is formed in a flat plane so as to be parallel to each other at two positions facing the circumferential direction of the outer periphery of the rotating shaft 41, the positions orthogonal to the pair of rotating surfaces 46 and 46. It is to be noted that as illustrated in FIG. 5, a distance r2 from the shaft center C of the rotating shaft 41 to the holding surface 47 is smaller than a distance r1 from the shaft center C of the rotating shaft 41 to the rotating surface 46 (r1>r2), and the holding surfaces 47 are each formed so as to be close to the shaft center C of the rotating shaft 41. As illustrated in FIGS. 5 and 8, the pair of holding surfaces 47 and 47 is formed so as to be in an orientation orthogonal to the bottom surface 2a of the recess 2 in a state where the hook member 40 is stored in an inner space of the recess 2 of the attached member 1 (stored state of the hook member).

It is to be noted that the hook member may have, for example, a substantially L-shape or a substantially J-shape, and is not particularly limited as long as the hook member has at least a rotating shaft rotatably supported by the holding member and a hanger connected consecutively to the rotating shaft, and is rotatably held by the holding member so as to be brought into a stored state close to the attached member, and a raised state erecting from the attached member.

Next, the holding member 20 will be described in detail. The holding member 20 of this embodiment is arranged in the recess 2 of the attached member 1, is attached to the bottom surface 2a of the recess 2, and is to hold the hook member 40 between the bottom surface 2a of the recess 2 of the attached member 1 and the holding member 20 (see FIG. 5).

Figure 3:
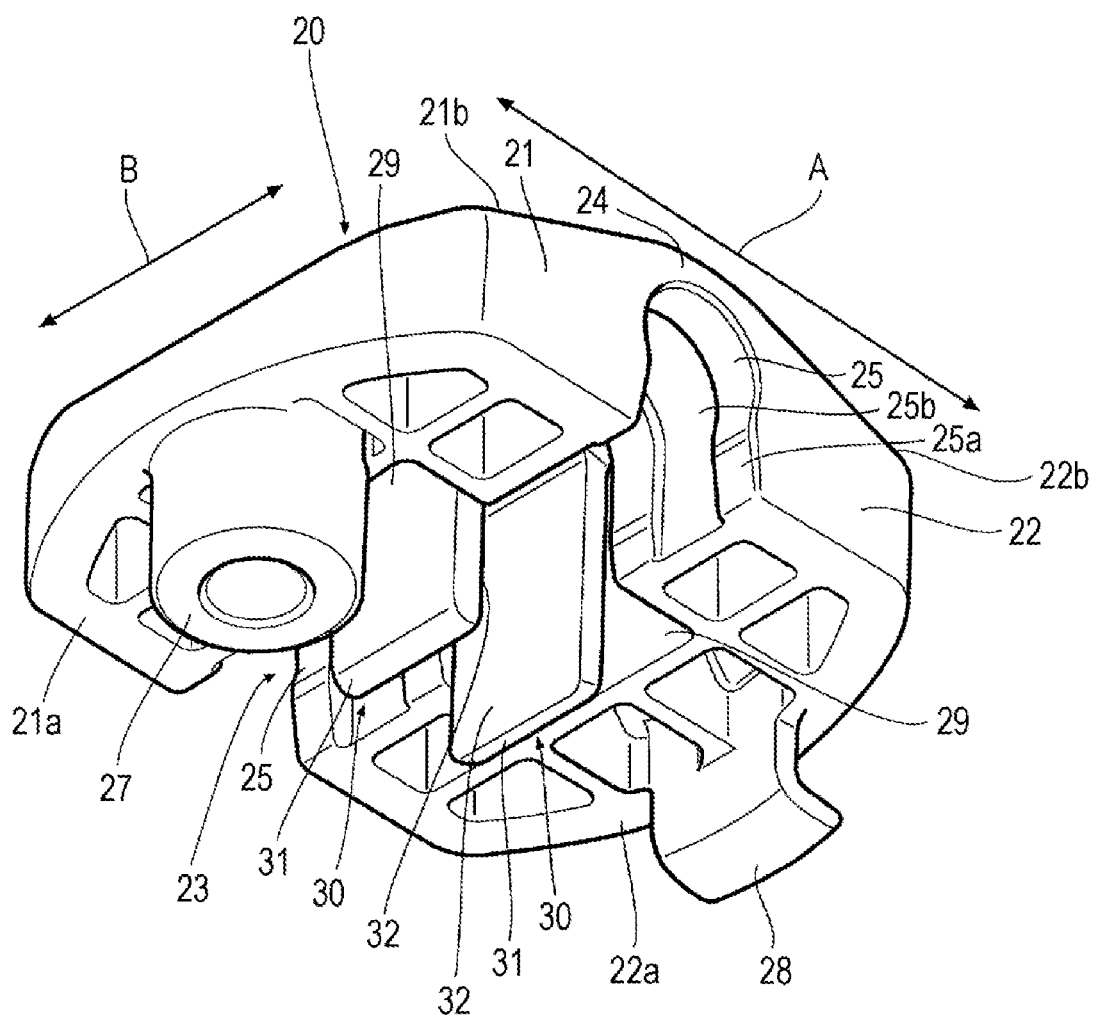
FIG. 3 is a perspective view of a holding member constituting the hook device.

As illustrated in FIGS. 1 and 3, the holding member 20 of this embodiment has a pair of base parts 21 and 22 extending in one direction corresponding to the substantially rectangular recess 2 and arranged in parallel with each other across a shaft arrangement space 23, and a coupler 24 coupling predetermined portions of facing surfaces of the pair of base parts 21 and 22 to each other via the shaft arrangement space 23. It is to be noted that let the direction in which the pair of base parts 21 and 22 is arranged via the shaft arrangement space 23 be an extending direction A of the holding member 20, and let the direction orthogonal to the extending direction A be a width direction B of the holding member 20.

The base parts 21 and 22 have flat abutting surfaces 21a and 22a that abut against the bottom surface 2a of the recess 2 when the holding member 20 is housed and arranged in the recess 2. The coupler 24 is arranged on the side opposite to the abutting surfaces 21a and 22a of the base parts 21 and 22, and is arranged at the highest position in the holding member 20. Furthermore, the surfaces of the base parts 21 and 22 on the opposite side to the abutting surfaces 21a and 22a form inclined surfaces 21b and 22b gradually inclined toward the tip end side or the base end side in the extending direction A of the holding member 20 so as to become lower than the coupler 24 as a boundary. The inclined surfaces 21b and 22b make it easier to put a finger and a hand on the hook member 40 when the hook member 40 is stored in the recess 2 of the attached member 1 as illustrated in FIG. 5 and FIG. 8.

As illustrated in FIG. 3, between the pair of base parts 21 and 22 and on both side portions in the width direction B of the holding member 20, shaft support holes 25 and 25 having a substantially circular hole shape are provided on the inner surface side of the coupler 24. Each shaft support hole 25 rotatably supports the rotating shaft 41 of the hook member 40. A receiver 25*a* gradually expanding toward the abutting surfaces 21*a* and 22*a* is formed from a position slightly exceeding the position of the maximum inner diameter of the inner periphery of each shaft support hole 25, and the shaft support hole 25 forms a keyhole shape as a whole. Furthermore, as illustrated in FIG. 3, a recess groove 25*b* having a shallow bottom is formed in each shaft support hole 25 and the inner periphery of the receiver 25*a*.

Then, as illustrated in FIG. 1, by matching the rotating shaft 41 of the hook member 40 with the shaft arrangement space 23 of the holding member 20 and pushing in it from the receiver 25*a*, the rotating shaft 41 is arranged in the shaft arrangement space 23, the annular portion 45 of the rotating shaft 41 is fitted into the recess groove 25*b* on the inner periphery of the shaft support hole 25, and the both axial ends of the rotating shaft 41 are arranged in the shaft support holes 25 and 25, whereby the hook member 40 is rotatably held by the holding member 20. It is to be noted that since the shaft support hole 25 has a keyhole shape, once the rotating shaft 41 is fitted in, it is difficult to remove it from the shaft support hole 25, and the holding member 20 and the hook member 40 can be integrated (assembled). Furthermore, as described above, the annular portion 45 of the rotating shaft 41 is fitted into the recess groove 25*b* on the inner periphery of the shaft support hole 25, and hence the hook member 40 is hardly displaced with respect to the width direction B of the holding member 20.

Furthermore, as illustrated in FIG. 3, a cylindrical screw portion 27 is projected from the widthwise center of one base part 21 on the abutting surface 21*a* side. The screw portion 27 is inserted and arranged into a receiver 6 provided in the recess 2 (see FIG. 5). A hook-shaped locking claw 28 extends outward of the holding member 20 from the widthwise center of the other base part 22 on the abutting surface 21*a* side. The locking claw 28 locks into the locking hole 4 of the recess 2 (see FIG. 5).

Furthermore, as illustrated in FIG. 3, the centers in the width direction B on the inner surface side where the pair of base parts 21 and 22 faces each other are notched by notches 29 and 29, respectively. Then, a pair of flexible elastic pieces 30 and 30 that matches the pair of notches 29 and 29 from the widthwise center of the coupler 24 on the inner surface side (surface facing the bottom surface 2*a* of the recess 2) of the coupler 24 and that is extended so as to form a band having a certain width toward the abutting surfaces 21*a* and 22*a* of the base parts 21 and 22. That is, the pair of elastic pieces 30 and 30 in this embodiment is to extend from a portion of the holding member 20 separated from the attached member 1 toward the attached member 1 side. The pair of elastic pieces 30 and 30 is formed integrally with the holding member 20.

As illustrated in FIGS. 5 to 8, each elastic piece 30 has a cantilevered shape in which the base end in the extending direction is coupled to the inner surface side of the coupler 24 and the tip ends 31 and 31 in the extending direction are free ends, and each elastic piece 30 is capable of flexural deformation. Inner surfaces 32 and 32, which are facing surfaces of the pair of elastic pieces 30 and 30, have a flat planar shape parallel to each other, and these inner surfaces 32 and 32 are arranged on the outer periphery of the rotating shaft 41 so as to sandwich the rotating shaft 41 arranged in the shaft arrangement space 23 of the holding member 20 (see FIG. 5).

Each elastic piece 30 extends in an orientation orthogonal to the surface direction of the flat abutting surfaces 21*a* and 22*a* of the base parts 21 and 22. Furthermore, as illustrated in FIG. 5, in a state where the abutting surfaces 21*a* and 22*a* of the base parts 21 and 22 of the holding member 20 are abutting against the bottom surface 2*a* of the recess 2, the pair of elastic pieces 30 and 30 is inserted into the pair of holes 3 and 3 of the recess 2 and extends in a length exiting from the outer surface side (opposite side to the surface facing the holding member 20) of the hole 3.

Furthermore, as illustrated in FIG. 5, a width W1 of the inner surfaces 32 and 32 (minimum distance between the inner surfaces 32 and 32) of the pair of elastic pieces 30 and 30 is smaller than a maximum distance W2 of the pair of rotating surfaces 46 and 46 of the rotating shaft 41 of the hook member 40, and is to be adapted to a maximum distance W3 of the pair of holding surfaces 47 and 47 of the rotating shaft 41.

Therefore, as illustrated in FIGS. 5 and 8, in a state where the hook member 40 is stored in the inner space of the recess 2 of the attached member 1 (stored state of the hook member 40), the inner surfaces 32 and 32 of the pair of elastic pieces 30 and 30 abut against the pair of holding surfaces 47 and 47 of the rotating shaft 41, which are oriented orthogonal to the bottom surface 2*a* of the recess 2, and the stored state of the hook member 40 is maintained. At this time, the inner surfaces 32 and 32 of the pair of elastic pieces 30 and 30 are in surface contact with the pair of holding surfaces 47 and 47 in a state where the pair of elastic pieces 30 and 30 is substantially not deformed, and the pressure force caused by the flexure deformation of the pair of elastic pieces 30 and 30 is substantially not applied to the pair of holding surfaces 47 and 47. It is to be noted that FIG. 5 illustrates a state in which the hook member 40 is stored so as to be horizontal with respect to the bottom surface 2*a* of the recess 2 of the attached member 1, and FIG. 8 illustrates a state in which the hook member 40 is rotated by 180° from the state in FIG. 5 and stored so as to be horizontal with respect to the bottom surface 2*a* of the recess 2.

On the other hand, as illustrated in FIGS. 6 and 7, in a state where the hook member 40 is raised from the inner space of the recess 2 of the attached member 1 (raised state of the hook member 40), the pair of elastic pieces 30 and 30 is deflected by being pushed from the inside by the pair of rotating surfaces 46 and 46 of the rotating shaft 41, and hence in a state where the pair of elastic pieces 30 and 30 has flexural deformation, the inner surfaces 32 and 32 abut against the pair of rotating surfaces 46 and 46 of the rotating shaft 41, and as a result, a pressure force is applied to the pair of rotating surfaces 46 and 46 of the rotating shaft 41 by the pair of elastic pieces 30 and 30.

As illustrated in FIG. 6, in a state where the hook member 40 is raised at the maximum rotation angle (state of being raised at an angle orthogonal to the bottom surface 2*a* of the recess 2), the inner surfaces 32 and 32 of the pair of elastic pieces 30 and 30 abut against the portion with the widest diameter (portion that becomes the maximum distance W2) of the pair of rotating surfaces 46 and 46 of the rotating shaft 41, and hence the pair of elastic pieces 30 and 30 is pushed out from the inner surface 32 side and deformed in a flexural manner in a direction away from each other, and the tip ends 31 and 31 abut against the inner peripheries of the pair of holes 3 and 3 provided in the recess 2, thereby restricting the amount of expansion. It is to be noted that when the hook member 40 is rotated with respect to the holding member 20, the flexural deformation amount of the pair of elastic pieces 30 and 30 in the above-described state is the largest, and the pressure force to the pair of rotating surfaces 46 and 46 is also the strongest.

When the hook member 40 is rotated in a direction F1 close to the attached member 1 from the state illustrated in FIG. 6, the pair of elastic pieces 30 and 30 is gradually elastically return, meanwhile the inner surfaces 32 and 32 of the pair of elastic pieces 30 and 30 are brought into sliding contact with the pair of rotating surfaces 46 and 46 of the rotating shaft 41, and hence the hook member 40 is rotated while applying a pressure force to the rotating surfaces 46 and 46. In this state, although the hook member 40 is about to rotate in the direction close to the attached member 1 due to a rotation torque T (see FIG. 7) caused by the dead weight of the hook member 40, when the rotation of the hook member 40 is stopped due to the pressure force of the pair of elastic pieces 30 and 30 with respect to the pair of rotating surfaces 46 and 46, the hook member 40 is to stop at the rotation angle (free stop).

As illustrated in FIG. 7, when the inner surfaces 32 and 32 of the pair of elastic pieces 30 and 30 exceed a boundary 48, of the rotating shaft 41, between the rotating surface 46 and the holding surface 47, the pair of elastic pieces 30 and 30 elastically returns so as to be close to the pair of holding surfaces 47 and 47. At this time, the abutting amount between the inner surfaces 32 and 32 of the pair of elastic pieces 30 and 30 and the pair of rotating surfaces 46 and 46 is reduced and the frictional force between the elastic piece 30 and the rotating surface 46 is reduced, whilst the pressure force by the pair of elastic pieces 30 and 30 is applied to the pair of holding surfaces 47 and 47. As a result, the free stop action by the pressure force of the pair of elastic pieces 30 and 30 does not function, and the hook member 40 can be rotated in the direction to be close to the attached member 1 by the pressure force of the pair of elastic pieces 30 and 30 applied to the pair of holding surfaces 47 and 47 and the rotation torque T (see FIG. 7) caused by the dead weight of the hook member 40.

It is to be noted that also when the hook member 40 is rotated in the direction opposite to the arrow F1, i.e., in a direction F2 close to the attached member 1, from the state illustrated in FIG. 6, the hook member 40 can be freely stopped at a predetermined angle, similarly to above, in a state where the inner surfaces 32 and 32 of the pair of elastic pieces 30 and 30 do not exceed the boundary 48 between the rotating surface 46 and the holding surface 47 of the rotating shaft 41, and when the hook member 40 is rotated until the inner surfaces 32 and 32 of the pair of elastic pieces 30 and 30 are brought into a state of exceeding the boundary 48 between the rotating surface 46 and the holding surface 47 of the rotating shaft 41, the hook member 40 can be rotated in the direction close to the attached member 1.

Furthermore, although the holding member 20 in this embodiment is to be directly fixed to the attached member 1 to hold the hook member 40 in a sandwiching manner, the holding member 20 may be configured to include a base and a cover (this will be described in another embodiment). Furthermore, the holding member may be configured to be a lid for blocking the upper opening of the recess 2, and may have a structure in which a pair of elastic pieces is integrally formed from the rear surface thereof, and the holding member is only required to at least have integrally formed elastic pieces.

Furthermore, although the elastic piece 30 in this embodiment is formed as a pair extending in parallel to each other, the elastic piece is not limited thereto, and may be formed as a pair of elastic pieces extending so as to form, for example, a substantially inversed V-shape without a vertex. In this embodiment, the pair of elastic pieces 30 and 30 is provided, but two or more pairs of elastic pieces may be provided. Furthermore, the number of elastic pieces may be one, three, or more. In short, the elastic piece may be integrally formed with the holding member, and may be configured so as to abut against the rotating surface of the rotating shaft in a flexural state when the hook member is raised, and so as to abut against the holding surface of the rotating shaft when the hook member is stored.

Next, the operations and effects of the hook device 10 according to the present invention having the above configuration will be described.

Figure 4:
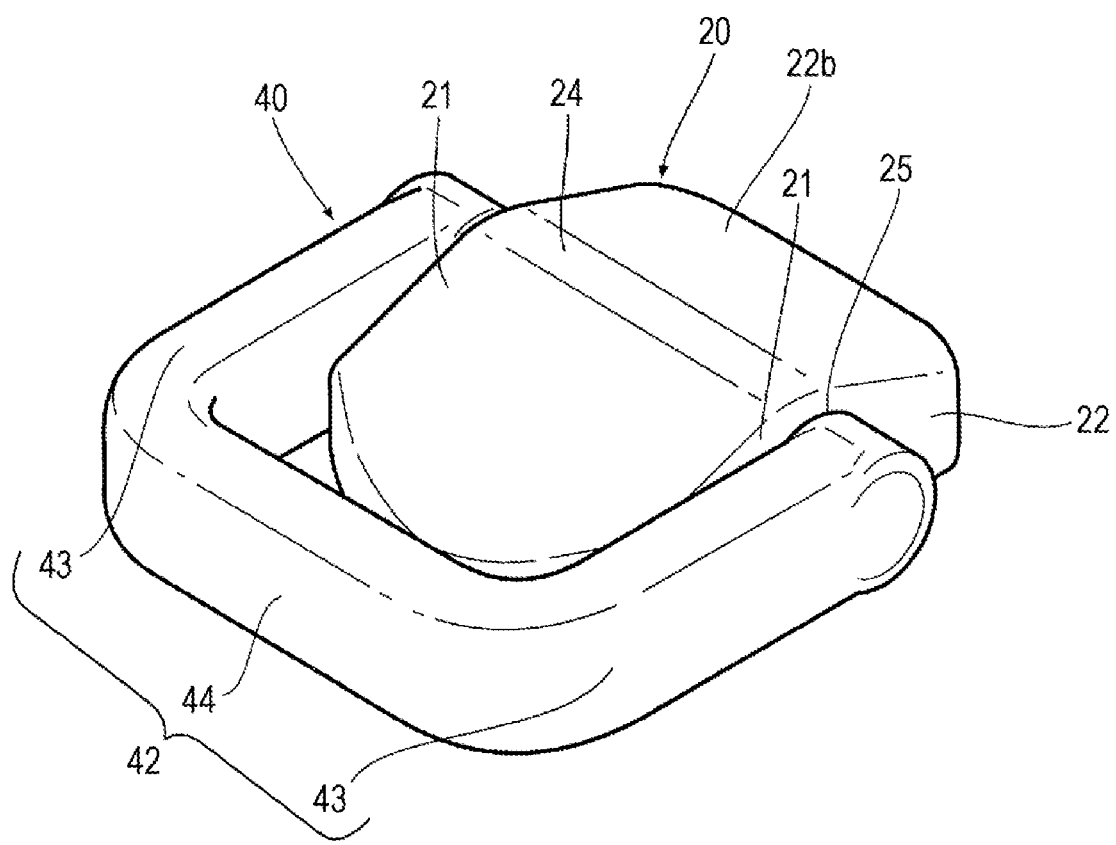
FIG. 4 is a perspective view of the hook device in a state where the hook member is held by the holding member.

First, as described above, by pushing the rotating shaft 41 of the hook member 40 into the shaft arrangement space 23 of the holding member 20 from the receiver 25a (see FIG. 1) and arranging both axial ends of the rotating shaft 41 into the shaft support holes 25 and 25, the hook member 40 can be rotatably held on the holding member 20, as illustrated in FIG. 4. Thereafter, the locking claw 28 of the holding member 20 is locked to the locking hole 4 of the recess 2, the pair of elastic pieces 30 and 30 of the holding member 20 is inserted into the pair of holes 3 and 3 of the recess 2, and the screw portion 27 of the holding member 20 is inserted into the receiver 5 provided in the recess 2, and hence the abutting surfaces 21a and 22a of the pair of base parts 21 and 22 of the holding member 20 abut against the bottom surface 2a of the recess 2. In this state, the holding member 20 is screwed and fixed by inserting the screw 9, which is a tapping screw, into the screw insertion hole 5a of the receiver 5 and then screwing it into the screw portion 27, and as a result, the hook device 10 can be attached to the attached member 1 in a state where the hook member 40 is sandwiched between the holding member 20 and the bottom surface 2a of the recess 2 of the attached member 1.

Then, as illustrated in FIGS. 5 and 8, it is possible to bring the hook member 40 into a usable state by raising the hook member 40 from, as illustrated in FIG. 6, a state where the hook member 40 is stored in the inner space of the recess 2 of the attached member 1. In this state, for example, a hook or the like provided on a vehicle net (not illustrated) can be used by hanging it on the hanger 42 of the hook member 40.

At this time, in the hook device 10, when the hook member 40 is brought into a raised state from a stored state as described above, the inner surfaces 32 and 32 abut against the pair of rotating surfaces 46 and 46 of the rotating shaft 41 of the hook member 40 with the pair of elastic pieces 30 and 30 of the holding member 20 being flexural. At this time, since the pair of rotating surfaces 46 and 46 is separated from the shaft center C of the rotating shaft 41 more than the pair of holding surfaces 47 and 47, the pair of elastic pieces 30 and 30 is more flexural than those when abutting against the holding surface 47, and pressed against the pair of rotating surfaces 46 and 46 with a relatively strong elastic force. As a result, the backlash of the hook member 40 can be reduced, and the hook member 40 can be easily maintained in a raised state.

When the inner surfaces 32 and 32 of the pair of elastic pieces 30 and 30 exceed the boundary 48 between the rotating surface 46 and the holding surface 47 of the rotating shaft 41 as illustrated in FIG. 7, by rotating the hook member 40 in the direction close to the attached member 1 as indicated by the arrow F1 of FIG. 6 from the raised state of the hook member 40 as illustrated in FIG. 6, the abutting amount between the inner surfaces 32 and 32 of the pair of elastic pieces 30 and 30 and the pair of rotating surfaces 46 and 46 decreases, and the frictional force between the elastic piece 30 and the rotating surface 46 decreases, while the hook member 40 can be rotated in the direction close to the attached member 1 by the pressure force of the pair of elastic pieces 30 and 30 applied to the pair of holding surfaces 47 and 47 and the rotation torque T caused by the dead weight of the hook member 40, and hence the hook member 40 can be easily returned to the stored state as illustrated in FIG. 5.

Furthermore, as illustrated in FIG. 5, in a state where the hook member 40 is stored in the inner space of the recess 2 of the attached member 1, the inner surfaces 32 and 32 of the pair of elastic pieces 30 and 30 abut against the pair of holding surfaces 47 and 47 of the rotating shaft 41 (here, surface contact), and hence the hook member 40 can be stably maintained in a stored state with less backlash.

Since the elastic piece 30 is formed integrally with the holding member 20 (here, the pair of elastic pieces 30 and 30 is integrally formed), the number of components can be reduced.

Furthermore, in this embodiment, as illustrated in FIG. 6, since the hole 3 forming a restrictor is provided on the attached member 1 side to restrict the expansion of the tip end 31 of the elastic piece 30 and restrict the excessive flexure of the elastic piece 30 in the raised state of the hook member 40, and it is hence possible to prevent the elastic piece 30 from being damaged or settled. Furthermore, in a state where the tip end 31 of the elastic piece 30 abuts against the inner periphery of the hole 3 serving as a restrictor to restrict the expansion thereof and the excessive flexure of the elastic piece 30 is restricted, the elastic piece 30 is held in a double-supported beam manner by the base end in the extending direction and the tip end 31 in the extending direction, and is pressed against the rotating shaft 41, and hence the pressure force of the elastic piece 30 can be further increased. This allows the hook member 40 to be easily maintained in a raised state, and the hook member 40 to be more easily returned to a stored state when the hook member 40 is rotated in the direction close to the attached member 1.

Furthermore, as illustrated in FIGS. 2 and 3, in this embodiment, at least one pair of elastic pieces 30 is provided on the holding member 20, and the holding surface 47 provided on the rotating shaft 41 is formed so as to form a flat plane at two positions facing in the circumferential direction of the rotating shaft 41. Hence, in a stored state of the hook member 40 as illustrated in FIGS. 5 and 8, the pair of elastic pieces 30 and 30 abuts against the holding surfaces 47 and 47 at the two positions facing in the circumferential direction of the rotating shaft 41, and thus backlash of the hook member 40 can be further reduced in a state where the hook member 40 is stored. When the hook member 40 is rotated in the direction close to the attached member 1 from the raised state of the hook member 40 as illustrated in FIG. 6, the elastic force due to the elastic return of the pair of elastic pieces 30 and 30 is applied to each of the outer peripheral surfaces of the rotating shaft 41 facing each other, and hence the hook member 40 can be further easily rotated in the direction close to the attached member 1, and the hook member 40 can be further easily returned to the stored state.

Furthermore, since at least the pair of elastic pieces 30 and 30 is provided on the holding member 20 and the holding surface 47 is formed so as to form a flat plane at two positions facing in the circumferential direction of the rotating shaft 41, when the hook member 40 is rotated so as to be brought from the raised state illustrated in FIG. 6 into the state of being stored horizontally with respect to the bottom surface 2a of the recess 2 of the attached member 1 as illustrated in FIGS. 5 and 8, the above-mentioned effects (effect of easily returning the hook member 40 to the stored state, effect of stably maintaining the hook member 40 in the stored state with reduced backlash, and so forth) can be achieved, thereby being capable of corresponding to a 180° rotation action of the hook member 40.

Furthermore, as illustrated in FIG. 6, in this embodiment, the attached member 1 is formed with the hole 3 forming a restrictor, and the elastic piece 30 is inserted into the hole 3, and hence the excessive flexure of the elastic piece 30 is to be restricted by the hole 3 in a raised state of the hook member 40. Therefore, the holes 3 and 3 of the attached member 1 can be used as a restrictor, and it is not necessary to separately provide a restrictor, thereby allowing the structure to be simplified by reducing the number of components. Furthermore, since excessive flexure of the elastic piece 30 can be restricted by using the hole 3 of the attached member 1 having relatively high rigidity, it is possible to stably carry out flexure restriction of the elastic piece 30.

FIGS. 9 to 14 illustrate another embodiment of the hook device according to the present invention. It is to be noted that substantially the identical parts to those of the embodiment described above are given the same reference numerals, and description thereof will be omitted.

In a hook device 10A in this embodiment, a holding member 20A includes a base 50 to be fixed to an attached member 1A, and a cover 60 to be mounted to the base 50 and holding a hook member 40A between the cover 60 and the base 50.

The attached member 1A in this embodiment is formed with a circular recess 2, and a circular recess receiver 2a (see FIG. 9) is formed on the bottom surface of the recess 2 at a predetermined depth.

Figure 11:
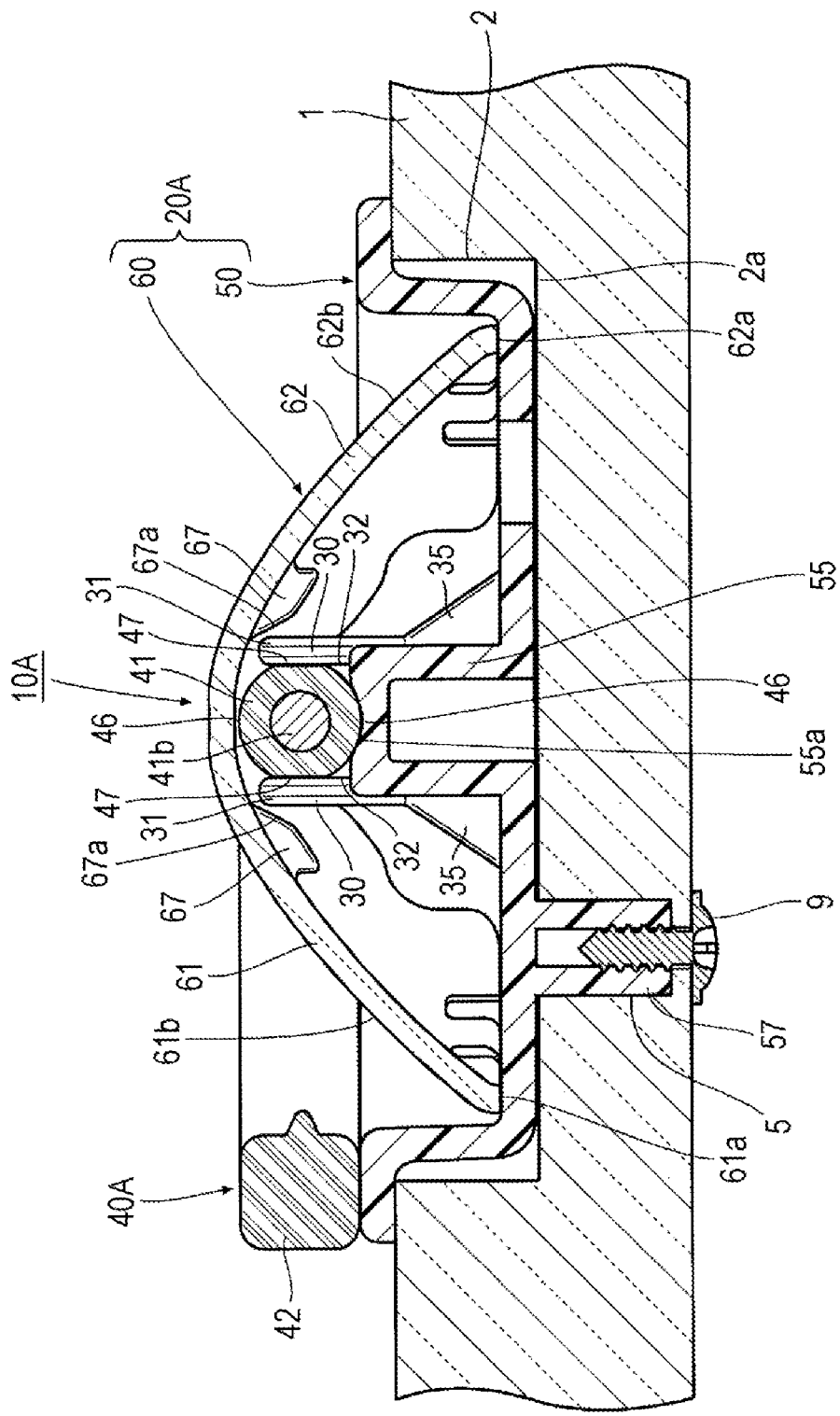
FIG. 11 is a cross-sectional explanatory view of the hook device in a state where the hook member is stored.
Figure 14:
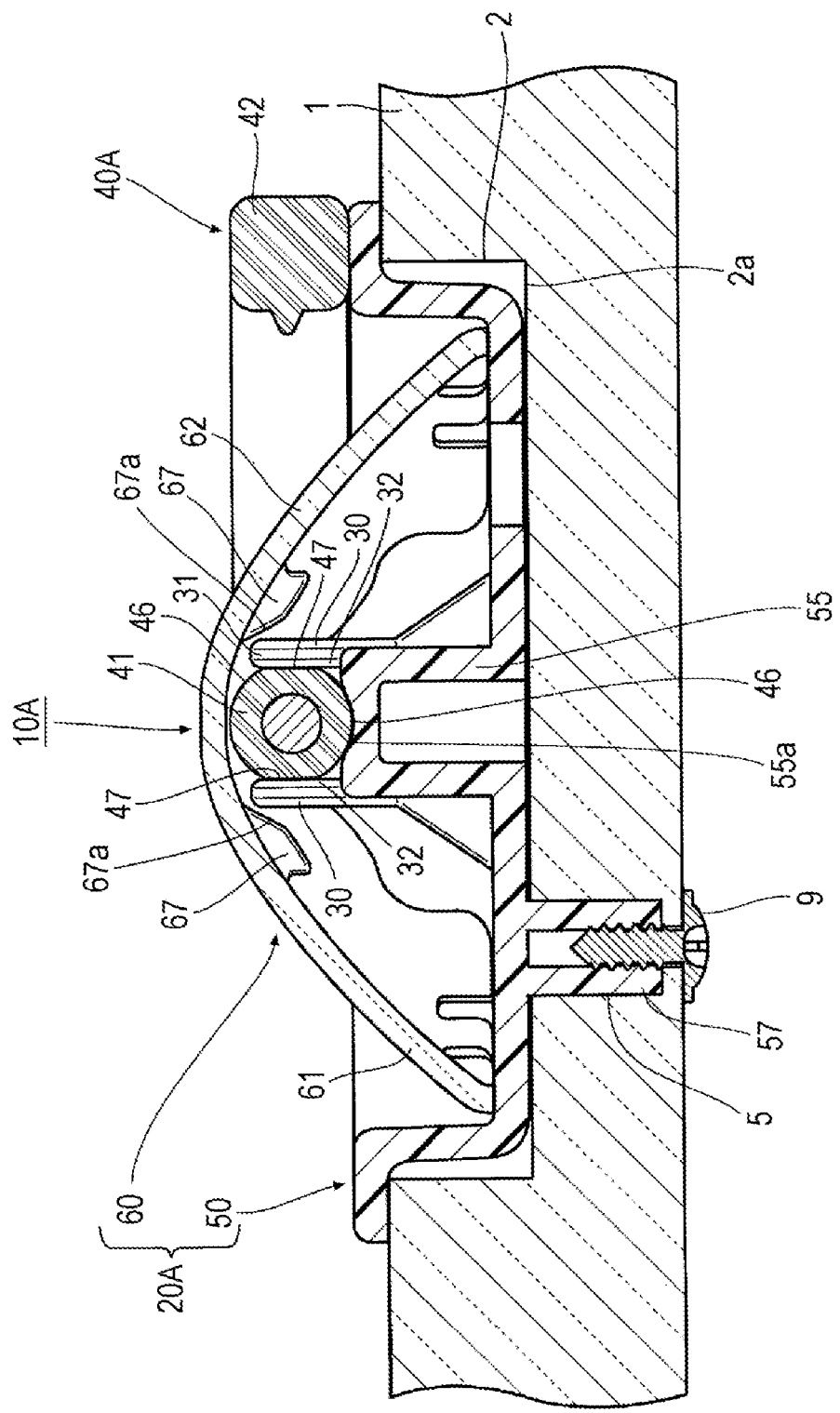
FIG. 14 is a cross-sectional explanatory view of the hook device in a state where the hook member is rotated by 180° with respect to the situation illustrated in FIG. 11 and stored.

Furthermore, in the hook member 40A of this embodiment, a hanger 42 has a substantially U-shape, and a shaft insertion hole 41a is formed in a rotating shaft 41, and a shaft 41b is to be inserted into the shaft insertion hole 41a. Both axial ends of the rotating shaft 41 are notched by notches 41c and 41c. It is to be noted that in the hook member 40A, as illustrated in FIGS. 11 and 14, the state of being stored in the base 50 of the holding member 20A becomes a stored state close to the attached member 1 in the present invention. Furthermore, the rotating shaft 41 is provided with a pair of rotating surfaces 46 and 46 and a pair of holding surfaces 47 and 47 at each of the both axial ends thereof (a total of four holding surfaces 47 are provided).

On the other hand, the base 50 has a disk-shaped bottom wall 51, a peripheral wall 52 erected from the peripheral edge of the bottom wall 51, and an annular flange 53 expanding from the outer periphery of the tip end of the peripheral wall 52 in the erection direction, and has a circular frame shape with an opening at the upper part. The flange 53 is locked, at its rear surface, to an opening peripheral edge of the recess 2 of the attached member 1, and is to be abutted against, at its front surface, by the hanger 42 of the hook member 40A when the hook member 40A is stored in the base 50.

In addition, a hook support piece 54 is projected from a circumferentially facing part of the flange 53, and is arranged outside the notches 41c and 41c of the rotating shaft 41 of the hook member 40A. The pair of hook support pieces 54 and 54 is respectively formed with shaft support holes 54a, and both axial ends of the shaft 41b of the hook member 40A are inserted into the shaft support holes 54a and 54a, whereby the hook member 40A is to be rotatably mounted to the base 50.

Furthermore, a bearing 55 that receives and rotatably supports the rotating shaft 41 of the hook member 40A is projected from the inner surface center of the bottom wall 51. An arcuate recess 55a is formed in the upper end surface of the bearing 55. A plurality of locking holes 56 is formed at a boundary between the bottom wall 51 and the peripheral wall 52. Furthermore, as illustrated in FIG. 11, at a predetermined position on the outer surface side of the bottom wall 51, a screw portion 57 to be inserted and arranged in a receiver 5 provided in the recess 2 is projected. As illustrated in FIG. 11, a screw 9 is screwed into the screw portion 57, whereby the base 50 is to be screwed and fixed to the recess 2.

Figure 9:
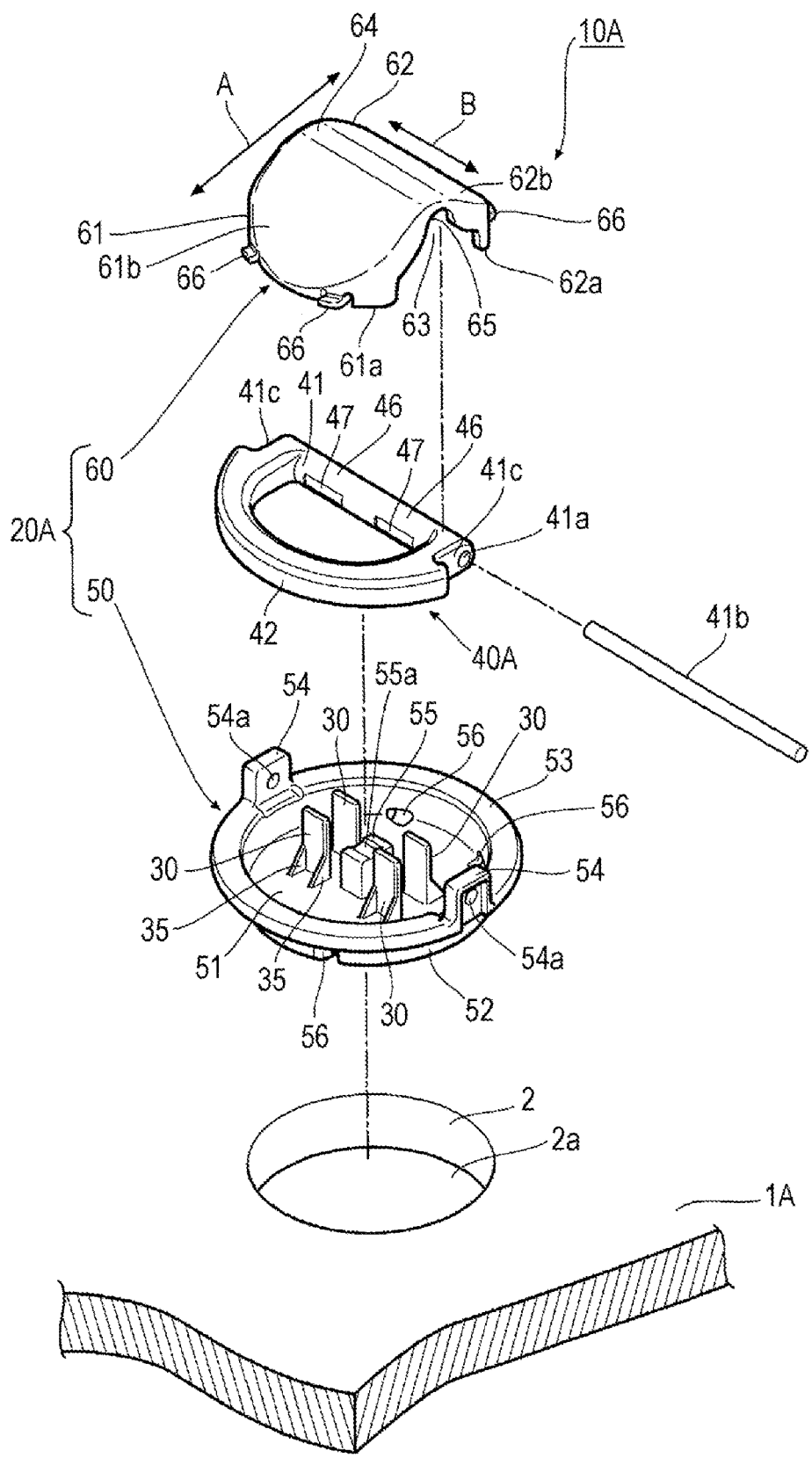
FIG. 9 is an exploded perspective view illustrating another embodiment of the hook device according to the present invention.

As illustrated in FIG. 9, a pair of elastic pieces 30 and 30 arranged in parallel to each other is extended respectively in a direction orthogonal to the surface direction of the bottom wall 51 from both sides of the bearing 55 on the inner surface of the bottom wall 51 of the base 50. That is, a total of four elastic pieces 30 are provided in pairs. It is to be noted that unlike the pair of elastic pieces 30 and 30 in the hook device 10 of the embodiment described above, the pair of elastic pieces 30 and 30 in this embodiment is different in that the elastic pieces 30 and 30 extend from the base 50 arranged on the attached member 1 side toward the cover 60 separated from the attached member 1. Furthermore, triangular plate-shaped reinforcing ribs 35 are provided on both widthwise sides of the outer surface of the base end of each elastic piece 30.

Figure 10:
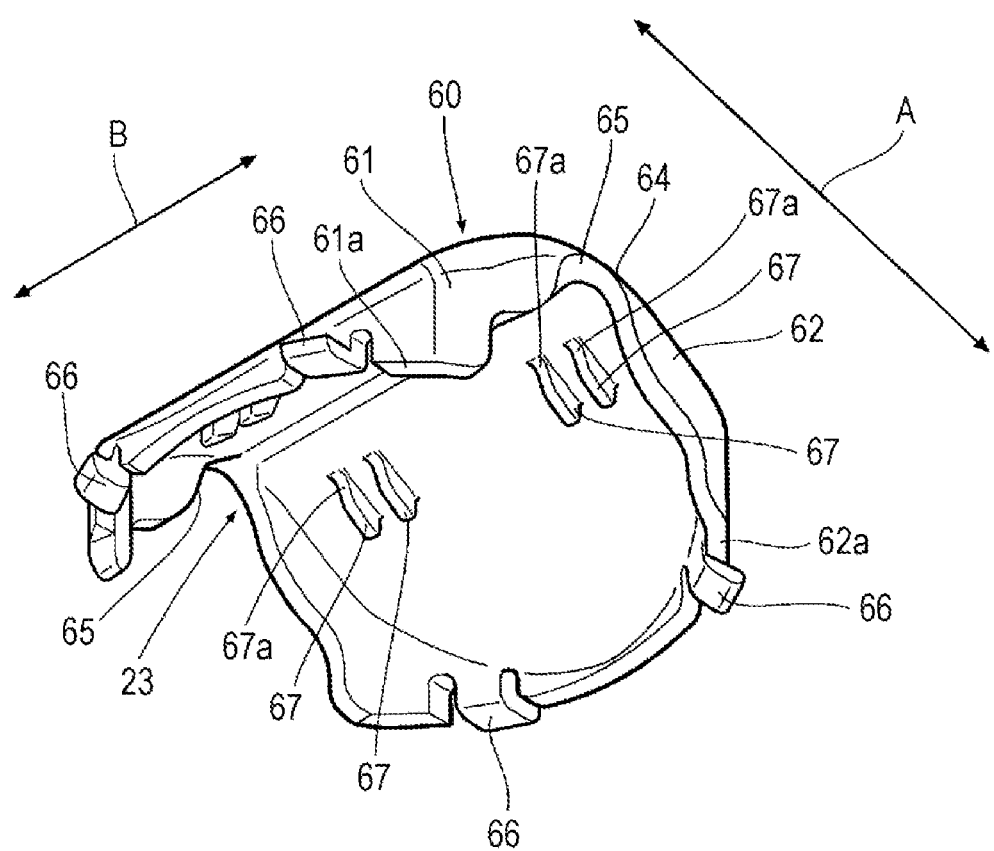
FIG. 10 is a perspective view of a cover constituting the holding member in the hook device.

On the other hand, as illustrated in FIGS. 9 and 10, the cover 60 has a shape elongated in one direction, and has a pair of base parts 61 and 62 arranged in parallel to each other across a shaft arrangement space 63, and a coupler 64 coupling the pair of base parts 61 and 62 to each other via the shaft arrangement space 63. It is to be noted that the direction in which the pair of base parts 61 and 62 is arranged via the shaft arrangement space 63 is an extending direction A of the cover 60, and the direction orthogonal to the extending direction A is a width direction B of the cover 60.

The base parts 61 and 62 have flat abutting surfaces 61a and 62a abutting against the bottom wall 51 of the base 50, and the surfaces of the base parts 61 and 62 on the side opposite to the abutting surfaces 61a and 62a form inclined surfaces 61b and 62b gradually inclined toward the tip end side or the base end side in the extending direction A of the cover 60. Furthermore, as illustrated in FIG. 10, shaft support holes 65 and 65 are formed between the pair of base parts 61 and 62 and on both sides in the width direction B of the cover 60, and the shaft support hole 65 has a shape expanded toward the abutting surfaces 61a and 62a. Furthermore, a pair of locking claws 66 and 66 is projected from the outer surfaces of the base parts 61 and 62 on the abutting surfaces 61a and 62a sides, and each locking claw 66 is locked in the corresponding locking hole 56 of the base 50, whereby the cover 60 can be mounted to the base 50 so as to sandwich the hook member 40A.

It is to be noted that in this embodiment, the elastic piece 30 is formed integrally with the base 50 and a restrictor 67 is formed in the cover 60, however, on the contrary, the base 50 may be provided with the restrictor and the cover 60 may be formed integrally with the elastic piece.

Figure 12:
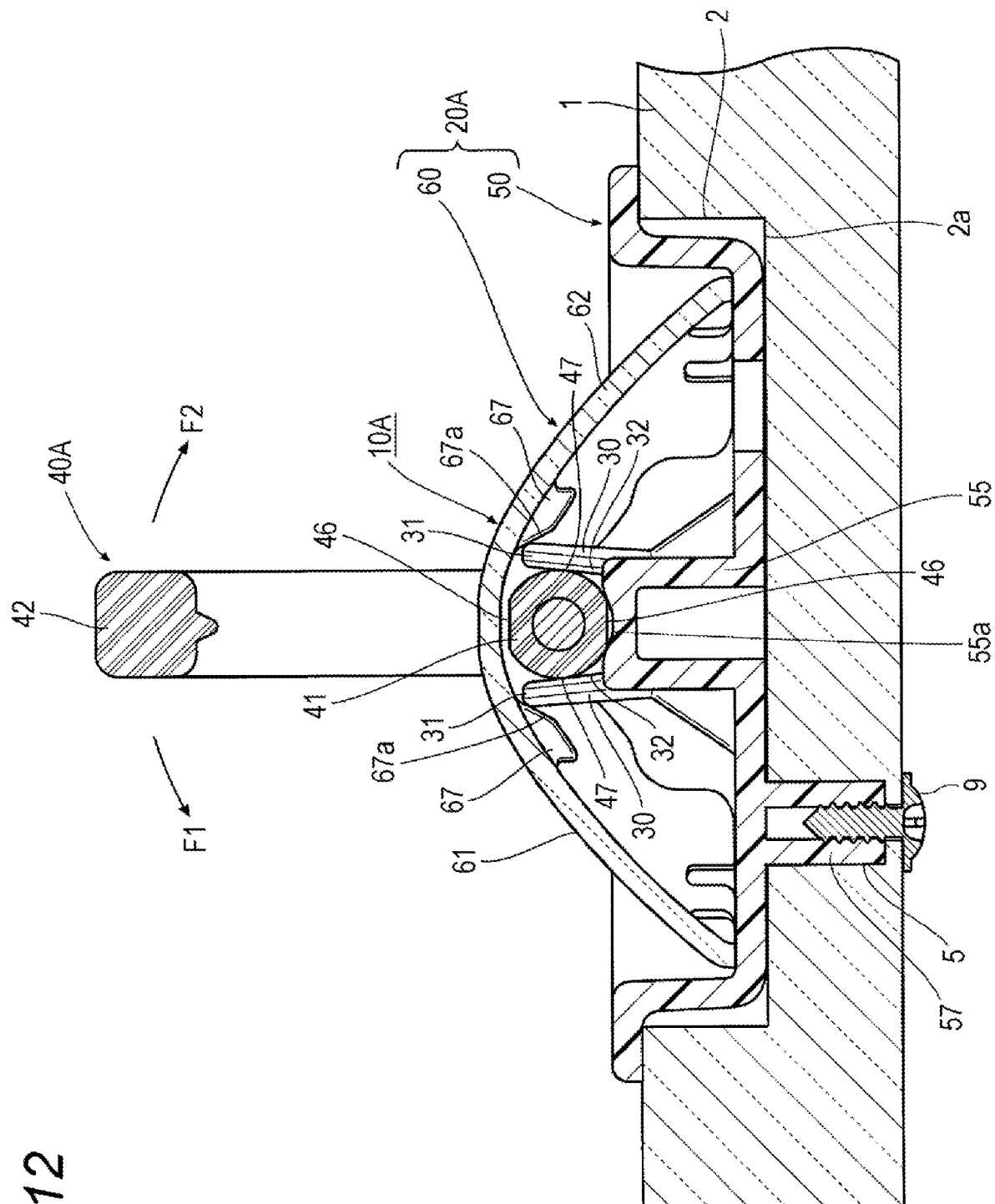
FIG. 12 is a cross-sectional explanatory view of the hook device in a state where the hook member is raised.

As illustrated in FIG. 10, a protrusion-shaped restrictor 67 for restricting excessive flexure of the elastic piece 30 is projected in a state where the hook member 40A is raised as illustrated in FIG. 12, on the inner surface side of the base parts 61 and 62 of the cover 60, at a position adjacent to the shaft arrangement space 63. Here, as illustrated in FIG. 10, the pair of restrictors 67 and 67 corresponding to the respective elastic pieces 30 is provided at positions adjacent to the shaft support holes 65 and 65 on the inner surface sides of the base parts 61 and 62, respectively, and the restrictor 67 provided on the base part 61 side and the restrictor 67 provided on the base part 62 side are arranged so as to face each other across the shaft arrangement space 63. That is, a total of eight restrictors 67 and 67, which come in pairs, are provided to restrict flexure of the four elastic pieces 30. As illustrated in FIG. 11, the facing surfaces of the restrictors 67 and 67, arranged so as to face each other on the left and right sides across the shaft arrangement space 63, form a tapered restriction surface 67a gradually expanding so as to be separated from each other toward the abutting surfaces 61a and 62a of the base parts 61 and 62 of the cover 60.

In the hook device 10A, as illustrated in FIGS. 11 and 14, in a state where the hook member 40A is stored in the base 50, the inner surfaces 32 and 32 of the elastic pieces 30 and 30 arranged to face each other come into surface contact with the pair of holding surfaces 47 and 47 of the rotating shaft 41 of the hook member 40A, and the hook member 40A is stably maintained in the stored state. In this state, the elastic piece 30 substantially has no flexural deformation, and a tip end 31 thereof does not abut against the restriction surface 67a of the restrictor 67.

When the hook member 40A is raised from inside the base 50 at the maximum rotation angle as illustrated in FIG. 12 from the stored state, the elastic pieces 30 and 30 are pressed from inside by the rotating surfaces 46 and 46 of the rotating shaft 41 to be flexural, and the elastic pieces 30 and 30 having flexural deformation apply a pressure force to the pair of rotating surfaces 46 and 46 of the rotating shaft 41, and the tip ends 31 and 31 of the elastic pieces 30 and 30 abut against the restriction surfaces 67a and 67a of the restrictors 67 and 67 to restrict excessive flexural deformation. In this state, since the elastic pieces 30 and 30 are pressed by the pair of rotating surfaces 46 and 46 by a relatively strong elastic force, backlash of the hook member 40 can be reduced and the hook member 40 can be easily maintained in the raised state.

Figure 13:
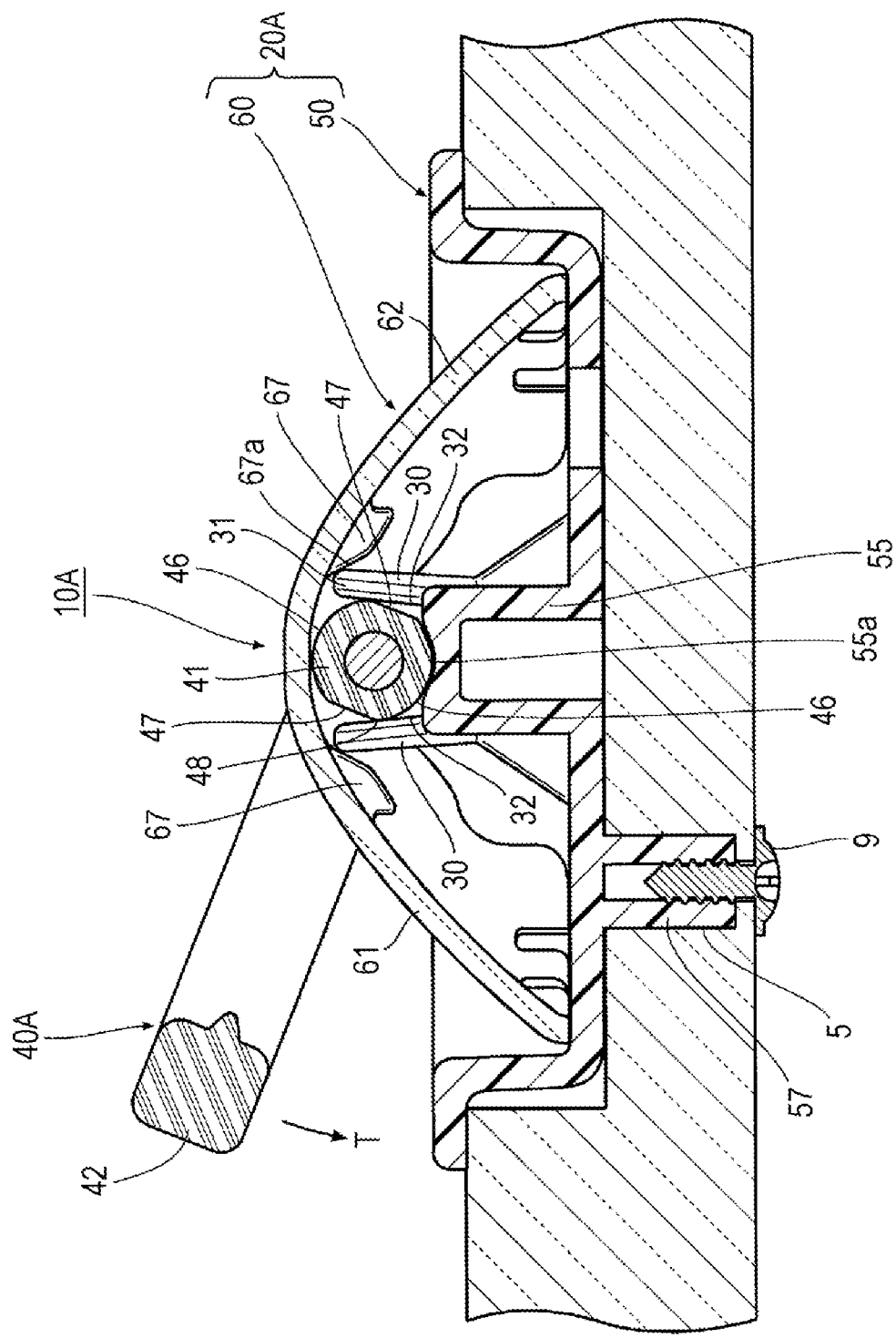
FIG. 13 is a cross-sectional explanatory view of the hook device when the hook member is rotated in a direction close to the attached member from the state illustrated in FIG. 12.

When the inner surfaces 32 and 32 of the pair of elastic pieces 30 and 30 exceed the boundary 48 between the rotating surface 46 and the holding surface 47 of the rotating shaft 41 as illustrated in FIG. 13, by rotating the hook member 40A in the direction close to the attached member 1 as indicated by the arrow F1 from the raised state of the hook member 40A as illustrated in FIG. 12, the abutting amount between the inner surfaces 32 and 32 of the elastic pieces 30 and 30 and the pair of rotating surfaces 46 and 46 decreases, and the frictional force between the elastic piece 30 and the rotating surface 46 decreases, while the hook member 40A can be rotated in the direction close to the attached member 1 by the pressure force of the pair of elastic pieces 30 and 30 applied to the pair of holding surfaces 47 and 47 and a rotation torque T caused by the dead weight of the hook member 40A, and hence the hook member 40A can be easily returned to the stored state as illustrated in FIG. 12.

In this embodiment, the holding member 20A includes the base 50 fixed to the attached member 1, and the cover 60 mounted to the base 50 and holding the hook member 40A between the cover 60 and the base 50, and since the elastic piece 30 is provided on the base 50 and the restrictor 67 is provided on the cover 60, the flexure restriction of the elastic piece 30 can be carried out by the base 50 and the cover 60 constituting the holding member 20A without using the attached member 1, and the flexure amount of the elastic piece 30 can be easily adjusted. It is to be noted that the similar effects can be achieved when the elastic piece is provided on the cover side and the restrictor is provided on the base side.

It is to be noted that the present invention is not limited to the above-described embodiments and various modified embodiments are possible within the scope of the gist of the present invention, and such embodiments are also included in the scope of the present invention.

LIST OF REFERENCE SIGNS 1, 1A Attached member
10, 10A HOOK DEVICE
20, 20A Holding member
25 Shaft support hole
30 Elastic piece
31 Tip end
32 Inner surface
40, 40A Hook member
41 Rotating shaft
42 Hanger
46 Rotating surface
47 Holding surface
48 Boundary
50 Base
60 Cover

The invention claimed is:

1. A hook device comprising:
a holding member to be attached to an attached member; and
a hook member to be rotatably held by the holding member, wherein
the holding member has an elastic piece integrally formed with the holding member,
the hook member has a rotating shaft rotatably supported by the holding member and a hanger connected consecutively to the rotating shaft, and the hook member is brought into a stored state where the hook member is close to the attached member and a raised state where the hook member erects from the attached member,
an outer periphery of the rotating shaft is provided with a rotating surface formed in an arc shape and a holding surface formed so as to approach a shaft center of the rotating shaft,
the elastic piece is configured so as to abut against the rotating surface of the rotating shaft in a flexural state in the raised state of the hook member, and abut against the holding surface of the rotating shaft in the stored state of the hook member,
in a circumferential direction of the outer periphery of the rotating shaft, the holding surface is formed on a part of the rotating shaft, and is not formed on another part of the rotating shaft, and
an abutting amount of the elastic piece against the holding surface of the rotating shaft in the stored state of the hook member is larger than an abutting amount of the elastic piece against the holding surface of the rotating shaft in the raised state of the hook member.

2. The hook device according to claim 1, wherein
the attached member or the holding member is provided with a restrictor for restricting excessive flexure of the elastic piece in the raised state of the hook member.

3. The hook device according to claim 2, wherein
the attached member is formed with a hole forming the restrictor, the elastic piece is inserted into the hole, and excessive flexure of the elastic piece is restricted by the hole in the raised state of the hook member.

4. The hook device according to claim 2, wherein
the holding member includes a base fixed to the attached member, and a cover mounted to the base and holding the hook member between the cover and the base, and
the elastic piece is provided on one of the base and the cover, and the restrictor is provided on another of the base and the cover.

5. The hook device according to claim 1, wherein,
when, the raised state of the hook member shifts to the stored state of the hook member shifts to, a frictional force between the elastic piece and the rotating surface increases.

6. A hook device comprising,
a holding member to be attached to an attached member; and
a hook member to be rotatably held by the holding member, wherein
the holding member has an elastic piece integrally formed with the holding member,
the hook member has a rotating shaft rotatably supported by the holding member and a hanger connected consecutively to the rotating shaft, and the hook member is brought into a stored state where the hook member is close to the attached member and a raised state where the hook member erects from the attached member,
an outer periphery of the rotating shaft is provided with a rotating surface formed in an arc shape and a holding surface formed so as to approach a shaft center of the rotating shaft, and
the elastic piece is configured so as to abut against the rotating surface of the rotating shaft in a flexural state in the raised state of the hook member, and abut against the holding surface of the rotating shaft in the stored state of the hook member,
wherein
at least one pair of the elastic pieces is provided on the holding member, and
the holding surface is formed so as to form a flat plane at two positions facing each other in a circumferential direction of the rotating shaft.

7. A hook device comprising:
a holding member to be attached to an attached member; and
a hook member to be rotatably held by the holding member, wherein
the holding member has at least one pair of elastic pieces integrally formed with the holding member,
the hook member has a rotating shaft rotatably supported by the holding member and a hanger connected consecutively to the rotating shaft, and the hook member is brought into a stored state where the hook member is close to the attached member and a raised state where the hook member erects from the attached member,
an outer periphery of the rotating shaft is provided with a rotating surface formed in an arc shape and a holding surface formed so as to approach a shaft center of the rotating shaft,
the pair of the elastic pieces extend toward a flat surface of the attached member, and
the rotating shaft is disposed between the pair of the elastic pieces.

8. The hook device according to claim 7, wherein in the pair of the elastic pieces, each elastic piece comprises a free end.

9. The hook device according to claim 8, wherein the free ends of the pair of the elastic pieces have shapes tapered in a same direction as one another and are inserted in the same direction as one another into holes disposed in the attached member.

10. The hook device according to claim 7,
wherein
a plurality of the rotating surfaces and a plurality of the holding surfaces are disposed on the outer periphery of the rotating shaft,
on an axial plane of the rotating shaft, a width between inner surfaces of the pair of the elastic pieces facing one another is smaller than a maximum distance between the rotating surfaces of the rotating shaft facing away from one another, and the width between the inner surfaces of the pair of the elastic piece is equal to a maximum distance between the holding surfaces of the rotating shaft facing away from one another.

\* \* \* \* \*